United States Patent
Arihara

(10) Patent No.: US 7,025,380 B2
(45) Date of Patent: Apr. 11, 2006

(54) POWER TELESCOPIC TYPE STEERING COLUMN

(75) Inventor: Koji Arihara, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 131 days.

(21) Appl. No.: 10/443,087

(22) Filed: May 22, 2003

(65) Prior Publication Data

US 2003/0222448 A1    Dec. 4, 2003

(30) Foreign Application Priority Data

May 29, 2002  (JP)  .............................. 2002-155266

(51) Int. Cl.
*B62D 1/18* (2006.01)
(52) U.S. Cl. ........................................ 280/775; 74/493
(58) Field of Classification Search ................ 280/775; 74/493
See application file for complete search history.

(56) References Cited

U.S. PATENT DOCUMENTS

| | | | |
|---|---|---|---|
| 4,602,520 A * | 7/1986 | Nishikawa et al. ............ 74/493 |
| 4,669,325 A * | 6/1987 | Nishikawa et al. ......... 74/89.23 |
| 4,691,587 A * | 9/1987 | Farrand et al. ................ 74/493 |
| 4,716,780 A * | 1/1988 | Nishikawa et al. ............ 74/493 |
| 4,900,059 A * | 2/1990 | Kinoshita et al. ............ 280/775 |
| 4,901,593 A * | 2/1990 | Ishikawa ...................... 74/493 |
| 5,188,392 A * | 2/1993 | Sugiki et al. ................ 280/775 |
| 5,193,848 A * | 3/1993 | Faulstroh .................... 280/775 |
| 5,265,906 A * | 11/1993 | Faulstroh .................... 280/775 |
| 5,690,362 A | 11/1997 | Peitsmeier et al. |
| 6,264,239 B1 * | 7/2001 | Link ........................... 280/777 |
| 2002/0117841 A1 * | 8/2002 | Landmann ................. 280/775 |

FOREIGN PATENT DOCUMENTS

| | | | |
|---|---|---|---|
| JP | 02048268 A | * | 2/1990 |
| JP | 9-11915 A | | 1/1997 |
| JP | 2572097 Y2 | | 2/1998 |

* cited by examiner

*Primary Examiner*—Paul N. Dickson
*Assistant Examiner*—Laura B Rosenberg
(74) *Attorney, Agent, or Firm*—Foley & Lardner LLP

(57) ABSTRACT

A stationary jacket is fixed to a vehicle body and a sliding jacket is axially slidably received in the stationary jacket. A steering shaft includes a first shaft part which is axially movable together with the sliding jacket and connected to a steering wheel and a second shaft part which is rotatable together with the first shaft part while being suppressed from moving in an axial direction. An opening is formed in the stationary jacket. An electric drive unit is fixed to an outer side of the stationary jacket. The drive unit has a threaded output shaft. A nut block is operatively engaged with the threaded output shaft. A binding bracket extends between the sliding jacket and the nut block through the opening of the stationary jacket. The binding bracket includes a round gripping portion which is disposed on the sliding jacket and two gripping arms which put therebetween the nut block. A tightening device applies a pressing force to the binding bracket to allow the same to tightly grasp the sliding jacket at the round gripping portion and the nut block at the two gripping arms.

23 Claims, 17 Drawing Sheets

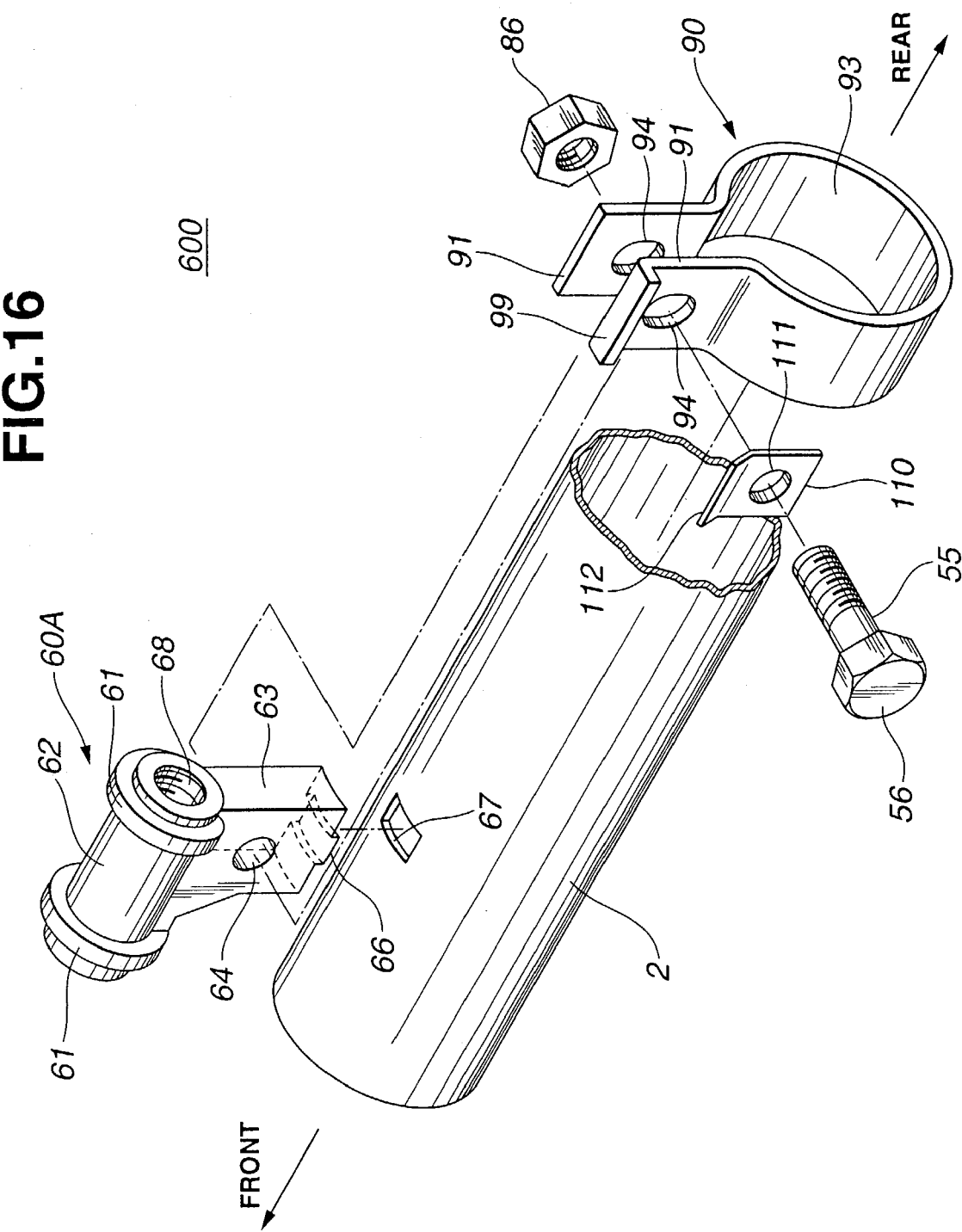

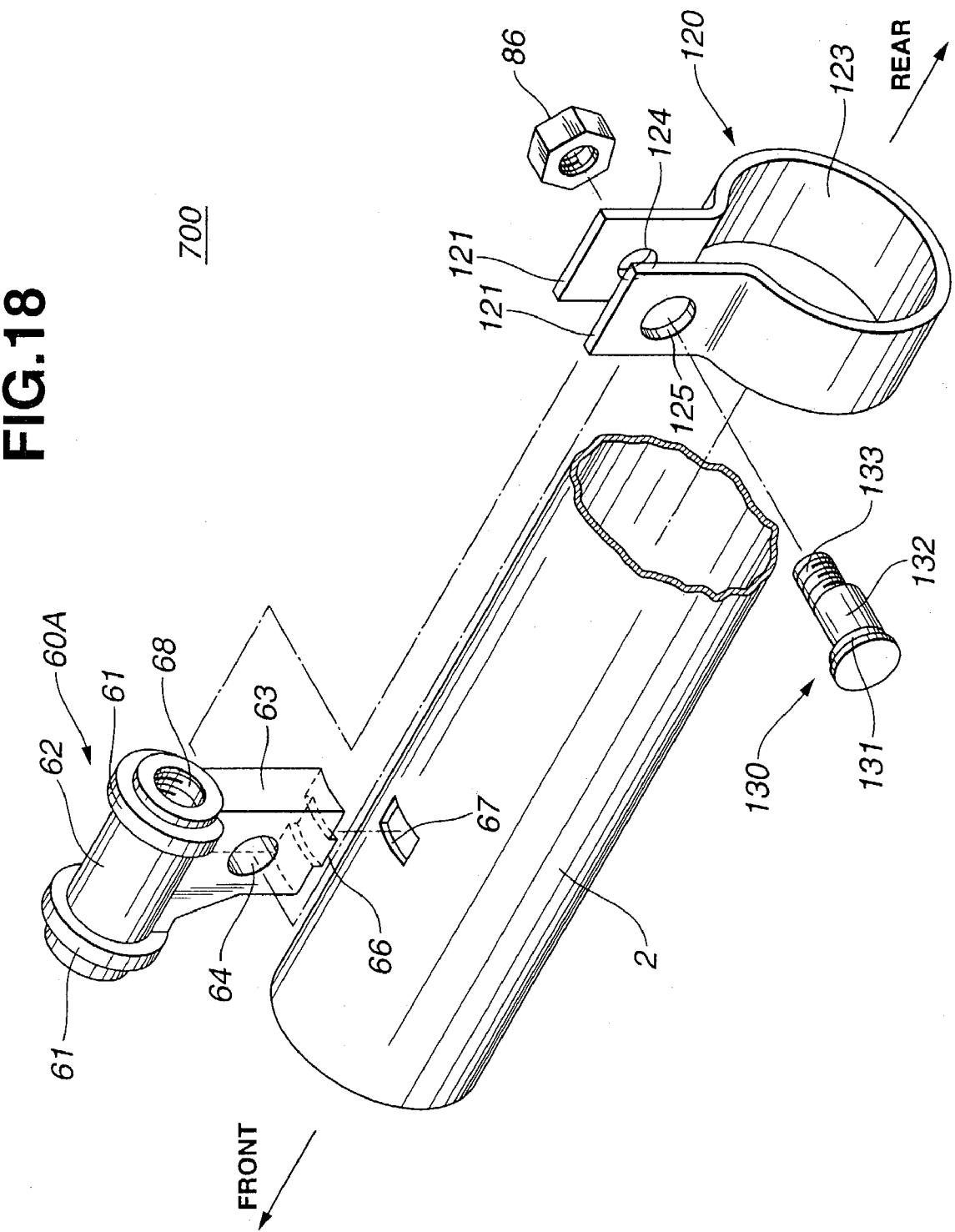

POWER TELESCOPIC TYPE STEERING COLUMN

BACKGROUND OF THE INVENTION

1. Field of the Invention

The present invention relates in general to steering columns of wheeled motor vehicles and more particularly to the steering columns of a power telescopic type which allows the steering column to be adjusted in length by the driver in a telescopic manner with the help of an electric power.

2. Description of the Related Art

Hitherto, various steering columns of a power telescopic type have been proposed and put into a practical use particularly in the field of wheeled motor vehicles. Hereinafter, such steering columns will be referred to a power telescopic type steering column for ease of description.

Exemplified steering columns of such type are shown in Japanese Utility Model 2572097 and Laid-open Japanese Patent Application (Tokkaihei) 9-11915.

In the steering column of the former publication, the power telescopic mechanism is positioned close to a steering wheel, while in the steering column of the latter publication, the mechanism is positioned apart from the steering wheel.

SUMMARY OF THE INVENTION

However, due to inherent construction, the power telescopic mechanisms of such publications tend to have the following drawbacks. That is, in the former steering column, due to close positioning of the power telescopic mechanism to the steering wheel and thus to the driver, a noise or hum inevitably produced by a motor of the mechanism is easily heard by the driver each time the adjustment is carried out, which makes him or her uncomfortable. Furthermore, such close positioning tends to cause a complicated wiring of electric parts incorporated with the steering wheel and power telescopic mechanism. In the latter steering column, it is inevitably necessary to provide a longer drive shaft which extends in the steering column from a fixed part of the same to a longitudinally movable part of the same with which the steering wheel slides. However, usage of such longer drive shaft in the column increases the possibility of interference with neighboring parts, such as a steering lock unit, wiring of electric parts and the like, which causes a difficulty in selecting a desired layout of the such parts in the steering column.

Accordingly, it is an object of the present invention to provide a power telescopic type steering column which is free of the above-mentioned drawbacks.

According to the present invention, there is provided a power telescopic type steering column which comprises a stationary jacket adapted to be fixed to a vehicle body; a sliding jacket axially slidably received in the stationary jacket; a steering shaft including a first shaft part which is axially movable together with the sliding jacket and adapted to be connected to a steering wheel and a second shaft part which is rotatable together with the first shaft part while being suppressed from moving in an axial direction; an opening formed in the stationary jacket; an electric drive unit fixed to an outer side of the stationary jacket, the drive unit having a threaded shaft driven thereby; a nut block operatively engaged with the threaded shaft; a binding bracket which extends between the sliding jacket and the nut block through the opening of the stationary jacket, the binding bracket including a round gripping portion which is disposed on the sliding jacket and two gripping arms which put therebetween the nut block; and a tightening device which applies a pressing force to the binding bracket to allow the same to tightly grasp the sliding jacket at the round gripping portion and the nut block at the two gripping arms.

BRIEF DESCRIPTION OF THE DRAWINGS

Other objects and advantages of the present invention will become apparent from the following description when taken in conjunction with the accompanying drawings, in which:

FIG. 16 is a view similar to FIG. 9, but showing an essential portion of a sixth embodiment of the present invention;

FIG. 18 is a view similar to FIG. 9, but showing an essential portion of a seventh embodiment of the present invention.

DETAILED DESCRIPTION OF THE EMBODIMENTS

In the following, embodiments of the present invention will be described in detail with reference to the accompanying drawings.

For ease of understanding, some directional terms, such as front, rear, upper, lower, right, left, forward and the like are used in the following description. However, such terms are to be understood with respect to a motor vehicle to which a power telescopic steering column of the present invention is practically applied. For example, a front portion of a steering column is referred to a portion which is near a steering gear box, a rear portion of the steering column is referred to a portion which is near a driver, and a right portion of the steering column is referred to a portion which is positioned right with respect to the driver.

Throughout the specification, substantially same parts and portions are denoted by the same numerals and redundant explanation on such parts and portions will be omitted for simplification of the description.

Referring to FIGS. 1 to 4, there is shown a power telescopic type steering column 100 which is a first embodiment of the present invention.

Figure 1:
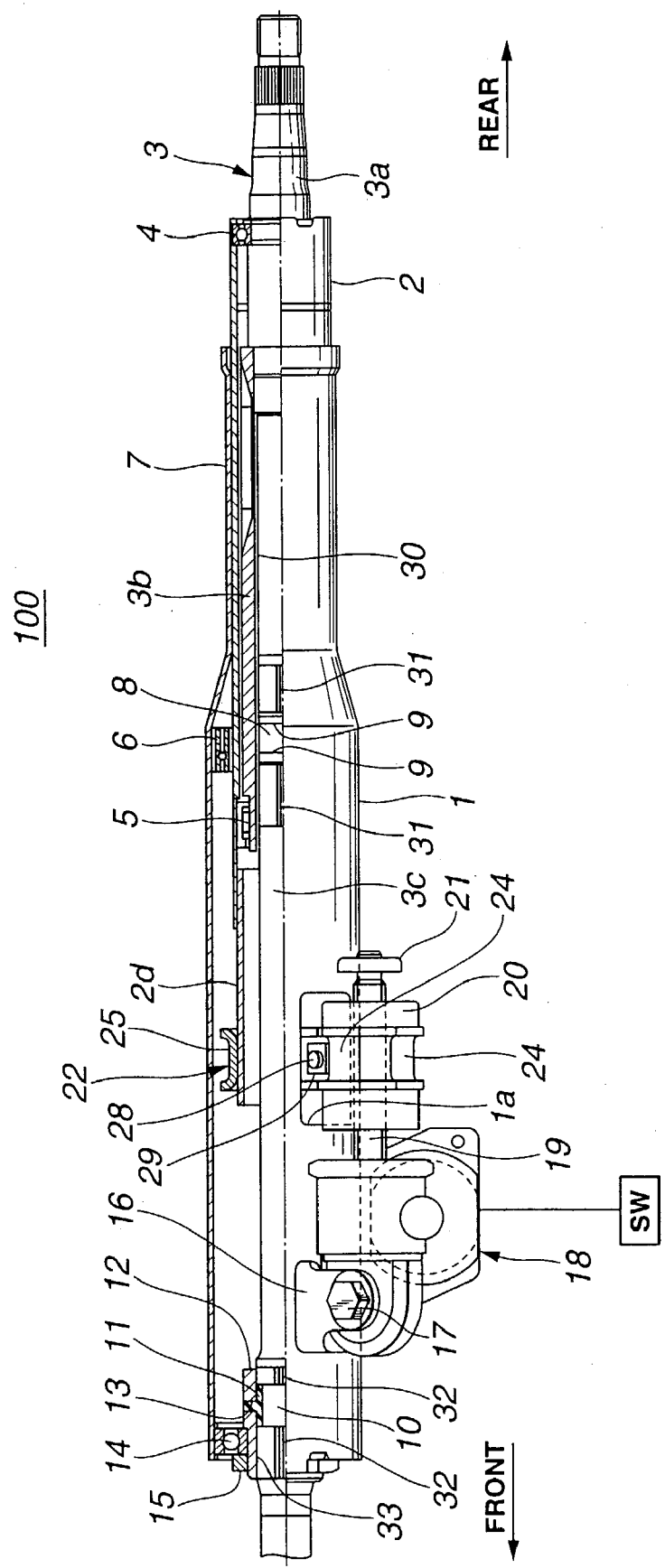
FIG. 1 is a partially sectioned side view of a power telescopic type steering column which is a first embodiment of the present invention.

As is seen from FIG. 1, the steering column 100 comprises a stationary jacket 1 which is secured to a vehicle body (not shown) through brackets (not shown). If the brackets are of a tilting type, the stationary jacket 1 can tilt relative to the vehicle body. A sliding jacket 2 is axially slidably coupled with the stationary jacket 1.

Within the sliding jacket 2, there is concentrically and rotatably disposed a steering shaft 3. The steering shaft 3 comprises a solid rear shaft 3a which has a steering wheel (not shown) fixed thereto, a hollow middle shaft 3b which has a rear end coupled with the solid rear shaft 3a and has a serrated portion 30 formed on a cylindrical inner wall thereof, and a front shaft 3c which has a rear end formed with axially spaced serrated portions 31 which are operatively engaged with the serrated portion 30 of the hollow middle shaft 3b.

The rear shaft 3a is rotatably held by the sliding jacket 2 through a ball bearing 4, and the middle shaft 3b connected with the rear shaft 3a is rotatably held by the sliding jacket 2 through a needle bearing 5.

The sliding jacket 2 is axially slidably held by the stationary jacket 1 through both a bush 6 and a diametrically reduced rear end portion 7 of the stationary jacket 1.

Between the serrated portions 31 formed on a rear end portion of the front shaft 3c, there is defined an annular groove 8 in which two blade springs 9 are operatively installed to suppress undesirable play of the front shaft 3c relative to the hollow middle shaft 3b.

On a front end of the front shaft 3c, there are formed axially spaced serrated portions 32. Between these serrated portions 32, there is defined an annular groove 10 which is filled with a molded plastic 11. The serrated portions 32 are engaged with a serrated portion 33 formed on a cylindrical inner wall of a bearing 12 which is disposed on the front end of the front shaft 3c. The bearing 12 is formed with an opening 13 which is filled with a molded plastic which is designed to be broken when, due to a vehicle collision or the like, a certain stress is applied thereto. To the bearing 12, there is mounted a ball bearing 14 by means of a nut 15. An outer race of the ball bearing 14 is fixed to an inner surface of the stationary jacket 1. An inner race of the ball bearing 14 is tightly mounted on the bearing 12. Although not shown in the drawing, to the front end (viz., left end in the drawing) of the front shaft 3c, there is connected an intermediate shaft through a universal coupling, and the intermediate shaft is connected to a steering gear box through another universal coupling.

To the stationary jacket 1 near the ball bearing 14, there is fixed a bracket 16 to which an electric drive unit 18 is connected through a bolt 17. The drive unit 18 constitutes part of a power telescopic mechanism.

As shown in FIG. 1, a control switch SW is provided for controlling the drive unit 18, which is placed near a driver's seat.

Figure 4:
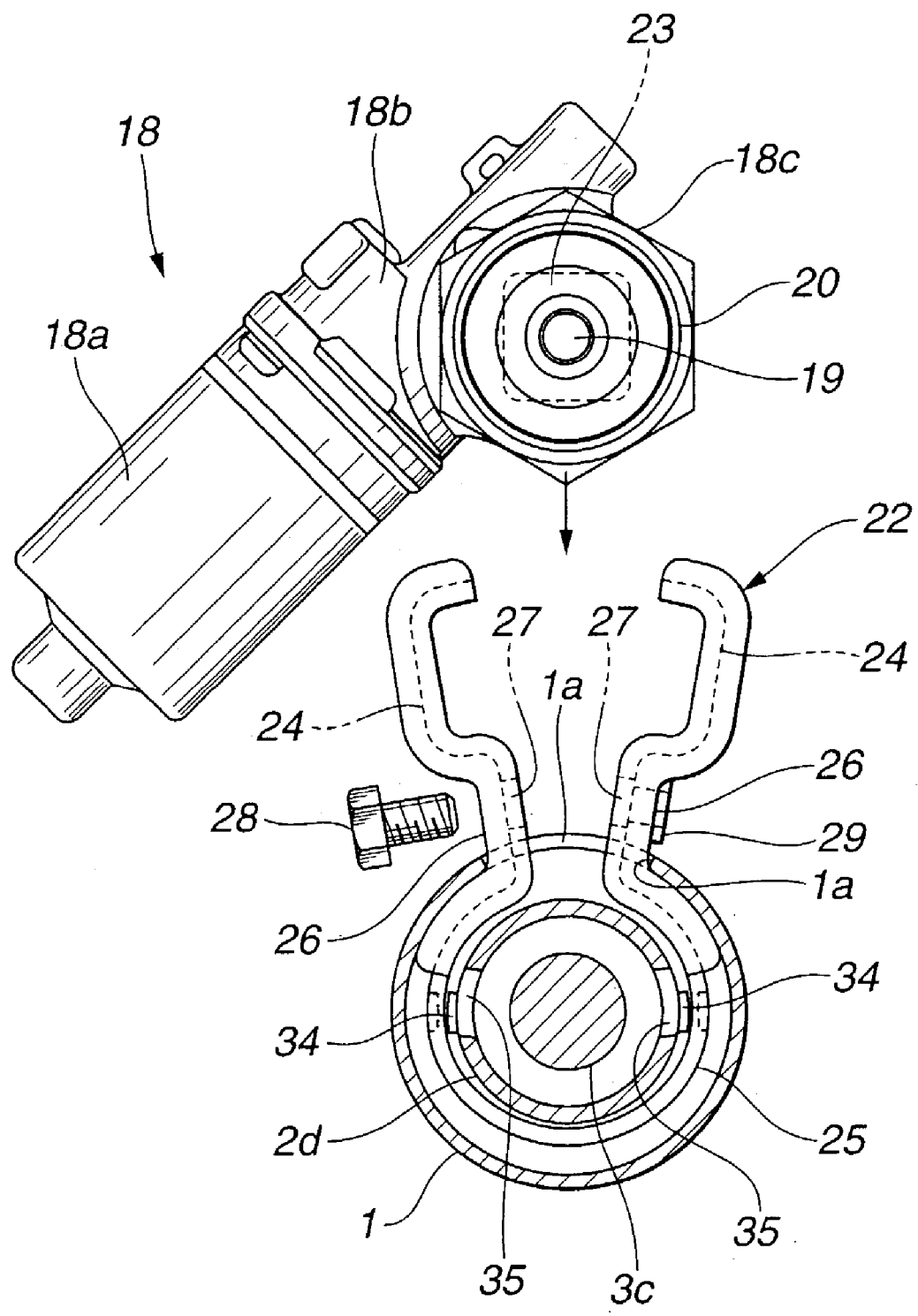
FIG. 4 is a partially sectional and exploded view of the essential portion of the power telescopic steering column of the first embodiment.

As is seen from FIG. 4, the drive unit 18 comprises an electric motor 18a and first and second speed reduction sections 18b and 18c which are assembled as a single unit. The electric motor 18a is connected to the control switch SW to be controlled by the same. That is, when a switch bar of the switch SW is moved in one direction, the motor 18a is energized to rotate in one direction, while when the switch bar is moved in the other direction, the motor 18a is energized to rotate in the other direction, and when the switch bar is moved to OFF position, the motor 18a is deenergized to stop its rotation. The first speed reduction section 18b has a worm (not shown) driven by an output shaft of the electric motor 18a, and the second speed reduction section 18c has a worm wheel (not shown) meshed with the worm of the first speed reduction section 18b. A threaded shaft 19 is connected to the worm wheel to rotate therewith as a single unit.

Referring back to FIG. 1, the threaded shaft 19 extends in parallel with the stationary jacket 1 rearward, which is, toward the steering wheel (not shown) fixed to the solid rear shaft 3a of the steering shaft 3. The threaded shaft 19 has a nut block 20 operatively engaged therewith and has a stopper 21 secured to a leading end thereof. The nut block 20 may be constructed of reinforced plastics.

Figure 2:
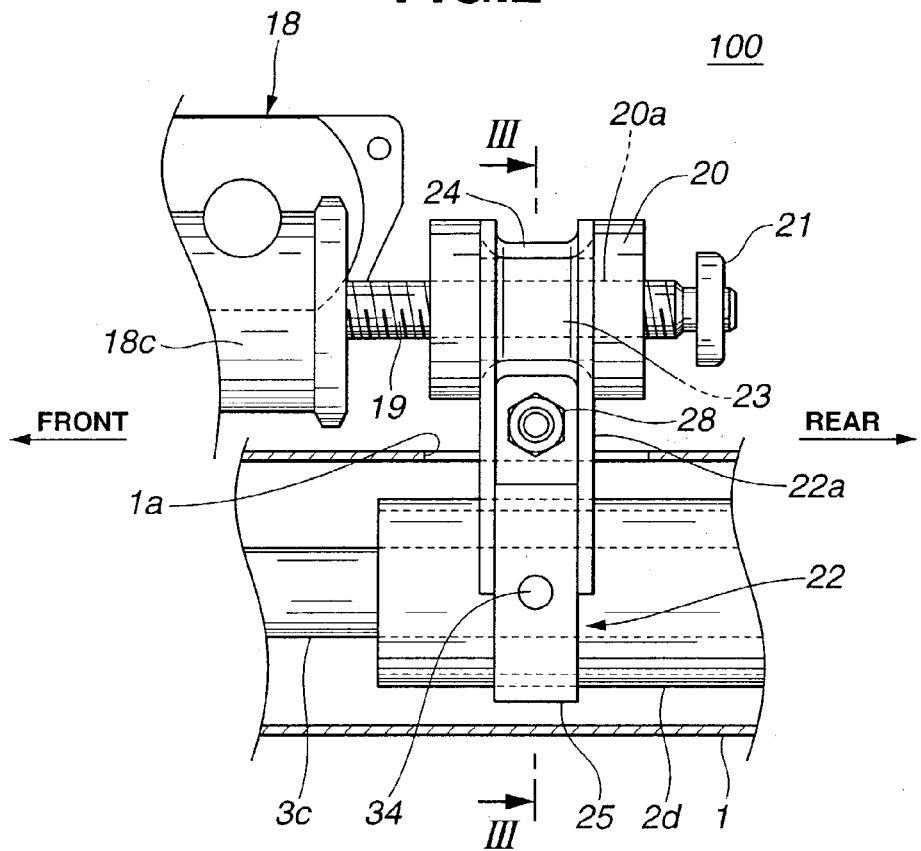
FIG. 2 is an enlarged and partially sectional view of an essential portion of the power telescopic type steering column of the first embodiment of the present invention.

As is well seen from FIGS. 1 and 2, for the engagement with the threaded shaft 19, the nut block 20 has a threaded bore 20a formed therethrough.

As is seen from FIG. 1, to a front end of the sliding jacket 2 which is located near the needle bearing 5, there is coaxially connected a tube 2d to move therewith. Press fitting, welding or the like may be used for the secured connection between the sliding jacket 2 and the tube 2d.

Around a front end of the tube 2d, there is tightly mounted a round gripping portion 25 of a binding bracket 22 which will be described in detail hereinafter.

It is now to be noted that as is seen from FIG. 1, the solid rear shaft 3a, the hollow middle shaft 3b, the sliding jacket 2, the tube 2d and the binding bracket 22 can axially move relative to the stationary jacket 1, like a single unit.

It is further to be noted that the hollow middle shaft 3b can axially move relative to the front shaft 3c which is rotatably held by the stationary jacket 1 while being prevented from making an axial movement relative to the stationary jacket 1.

As is seen from FIG. 2, the binding bracket 22 has an elongate portion 22a which passes through a rectangular opening 1a formed in the stationary jacket 1. Thus, the elongate portion 22a and thus the binding bracket 22 is permitted to move within a given length defined by an axial length of the rectangular opening 1a. The elongate portion 22a projected from the rectangular opening 1a has the nut block 20 secured thereto by a bolt 28.

Figure 3:
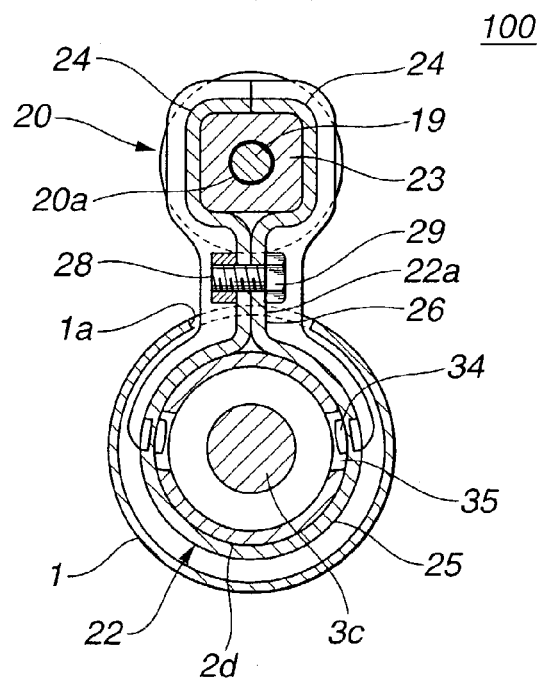
FIG. 3 is a sectional view taken along the line III—III of FIG. 2.

That is, as is seen from FIGS. 2 and 3, the nut block 20 is formed with a neck portion 23 which has a generally rectangular cross section. The rectangular neck portion 23 is intimately gripped by two gripping arms 24 which are possessed by the round gripping portion 25 of the binding bracket 22. Thus, the two gripping arms 24 constitute the above-mentioned elongate portion 22a of the binding bracket 22. Preferably, the axial length of the rectangular opening 1a is greater than the diameter of the round gripping portion 25 of the binding bracket 22 for permitting insertion of the round gripping portion 25 into the stationary jacket 1 therethrough. This measure facilitates an assembling work for mounting the binding bracket 22 to the tube 2d. The bolt 28 is used for not only tightly connecting the round gripping portion 25 to the tube 2d but also tightly connecting the two gripping arms 24 to the nut block 20, as will become apparent from the following description.

That is, as is seen from FIG. 4, the binding bracket 22 comprises the round gripping portion 25 which is put around the tube 2d and the two gripping arms 24 which extend radially outward from circumferentially opposed ends of the round gripping portion 25 and are put on the rectangular neck portion 23 of the nut block 20. At base portions of the gripping arms 24, there are respectively formed recessed portions 26 each having a bolt opening 27. A nut 29 is welded to one of the bolt openings 27, as shown. Thus, when the bolt 28 passing through the bolt openings 27 and engaged with the nut 29 is turned in a fastening direction, the two gripping arms 24 are brought close to each other to establish the secured connection of the binding bracket 22 to the tube 2d as well as to the nut block 20.

For preventing a free movement of the round gripping portion 25 relative to the tube 2d, the portion 25 is formed at diametrically opposed portions with projections 34 which are projected into openings 35 formed in diametrically opposed portions of the tube 2d. For increasing a mechanical strength of the gripping arms 24 of the binding bracket 22, each arm 24 has an elongate bent edge.

If desired, prevention of the free movement of the round gripping portion 25 relative to the tube 2d may be established by the following modification 100'.

Figure 5:
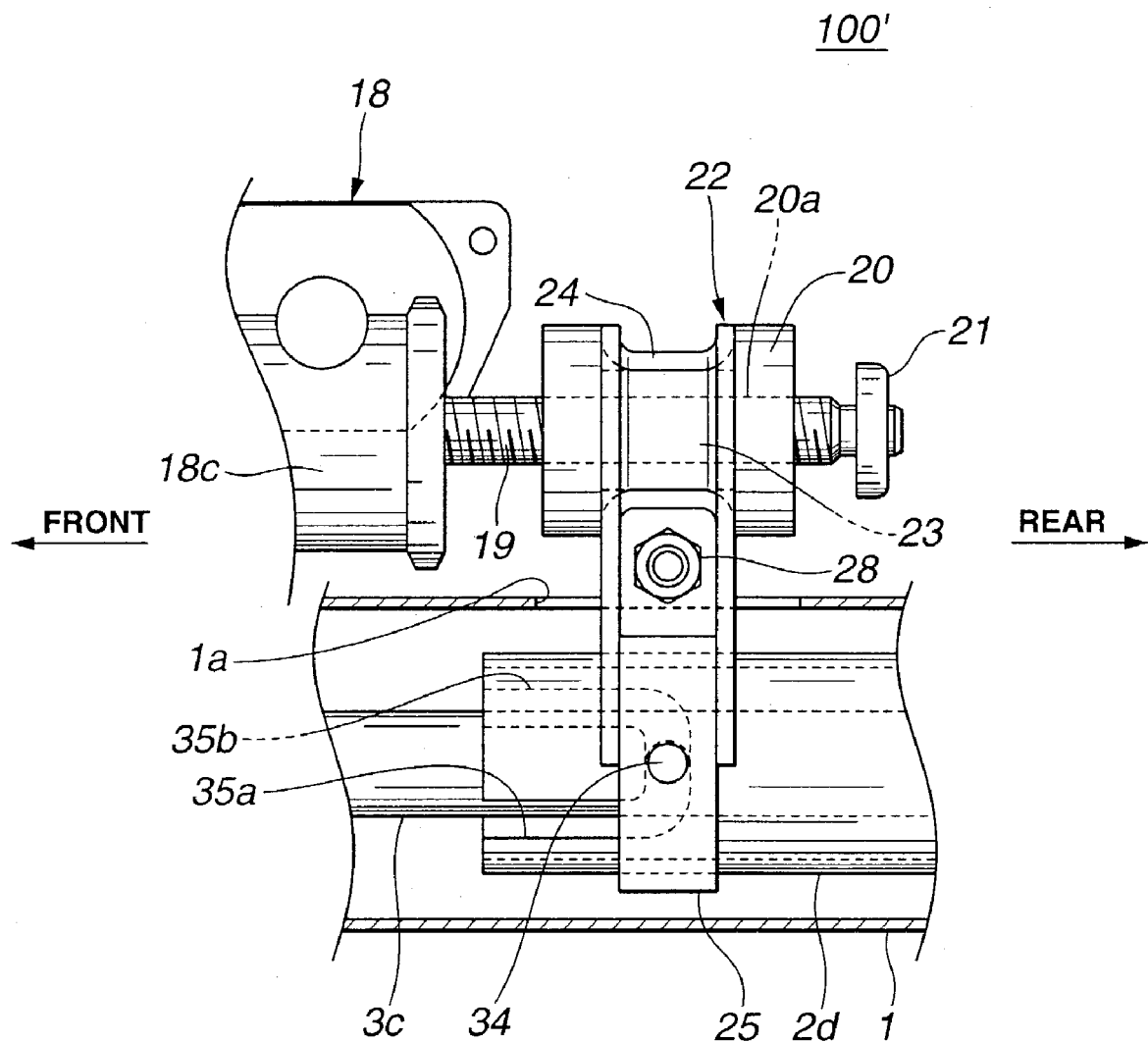
FIG. 5 is a view similar to FIG. 2, but showing a modification of the power telescopic type steering column of the first embodiment.

That is, as is shown in FIG. 5, in this modification 100', in place of the above-mentioned openings 35, there are employed generally L-shaped slits 35a and 35b which are formed in diametrically opposed portions of the tube 2d for receiving the projections 34 of the round gripping portion 25. In this modification 100', engagement of the projections 34 with the slits 35a and 35b is readily carried out. That is, for achieving the engagement, the round gripping portion 25 is put on the open front end of the tube 2d having the projections 34 mated with entrance portions of the slits 35a and 35b and then the round gripping portion 25 is slid axially rearward, that is, rightward in FIG. 5. With this, each projection 34 of the round gripping portion 25 is slid in the corresponding slit 35a or 35b and finally placed in the deepest part of the slit 35a or 35b.

In the following, assembling steps for mounting the binding bracket 22 to the tube 2d and nut block 20 will be described with reference to FIGS. 1 and 2.

With the bearing 12 and the front shaft 3c being not installed in the stationary jacket 1, the round gripping portion 25 of the binding bracket 22 is inserted into the stationary jacket 1 through the rectangular opening 1a, and the sliding jacket 2 is moved axially to achieve coupling of the gripping portion 25 with the tube 2d and then achieve engagement of the projections 34 of the gripping portion 25 with the openings 35 of the tube 2d. Then, the two gripping arms 24 are opened in a manner as is seen from FIG. 4 and put on the rectangular neck portion 23 of the nut block 20. Then, the bolt 28 is passed through the bolt openings 27 and tightly engaged with the nut 29. With these steps, the binding bracket 22 is tightly fixed to the tube 2a and to the nut block 20, in such a manner as is seen from FIGS. 2 and 3.

In the following, operation of the power telescopic type steering column 100 of the first embodiment will be described with the aid of the drawings, particularly FIG. 1.

When the switch bar of the control switch SW is moved in one direction, the drive unit 18 is energized to rotate the threaded shaft 19 in one direction. With this, for example, the nut block 20 is moved rearward toward the driver, that is, rightward in the drawing together with the binding bracket 22. Thus, the tube 2d and thus the sliding jacket 2 connected to the tube 2d are moved in the stationary jacket 1 toward the driver like a single unit. With this movement of the sliding jacket 2, the solid rear shaft 3a of the steering shaft 3, which is connected to the sliding jacket 2, is moved toward the driver, shifting the steering wheel disposed on the solid rear shaft 3a toward the driver.

When the switch bar of the switch SW is moved to OFF position, the drive unit 18 becomes deenergized, and thus the sliding jacket 2 stops its movement. With this, the steering wheel keeps the new close position. Due to the nature of the meshed engagement between the worm and the worm wheel of the drive unit 18, axial movement of the sliding jacket 2 relative to the stationary jacket 1 is suppressed under the de-energization of the drive unit 18.

When now the switch bar is moved in the other direction, the drive unit 18 is energized to rotate the threaded shaft 19 in the other direction. Thus, the sliding jacket 2 is slid in the stationary jacket 1 in a direction away from the driver thereby bringing the steering wheel away from the driver. When then the switch bar is moved to OFF position, the drive unit 18 is deenergized causing the steering wheel to stop at the distant new position.

Figure 7:
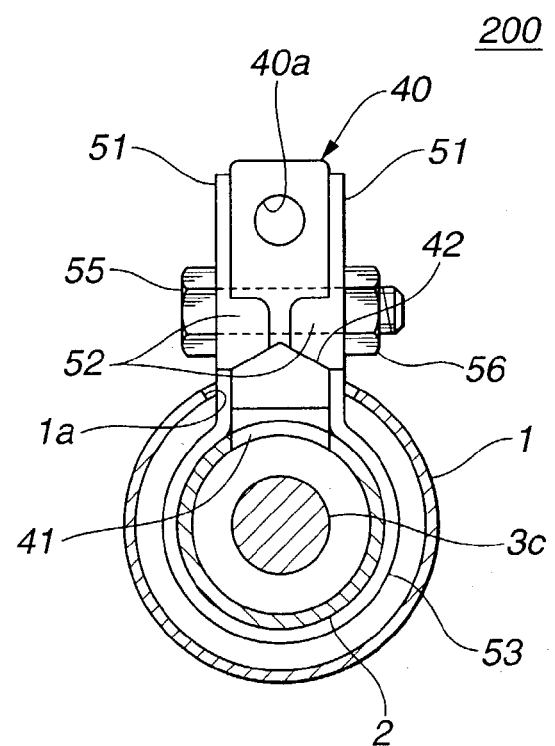
FIG. 7 is a sectional view taken along the line VII—VII of FIG. 6.
Figure 8:
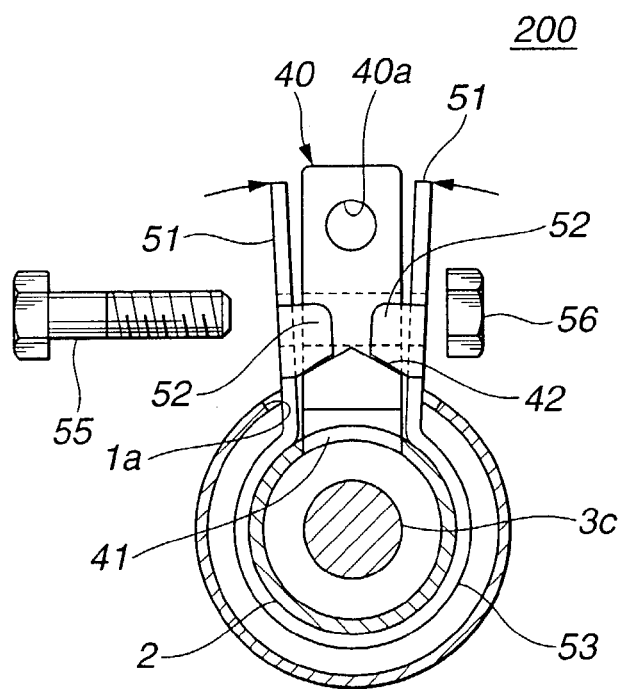
FIG. 8 is a view similar to FIG. 7, but showing a condition wherein a bolt is removed.
Figure 9:
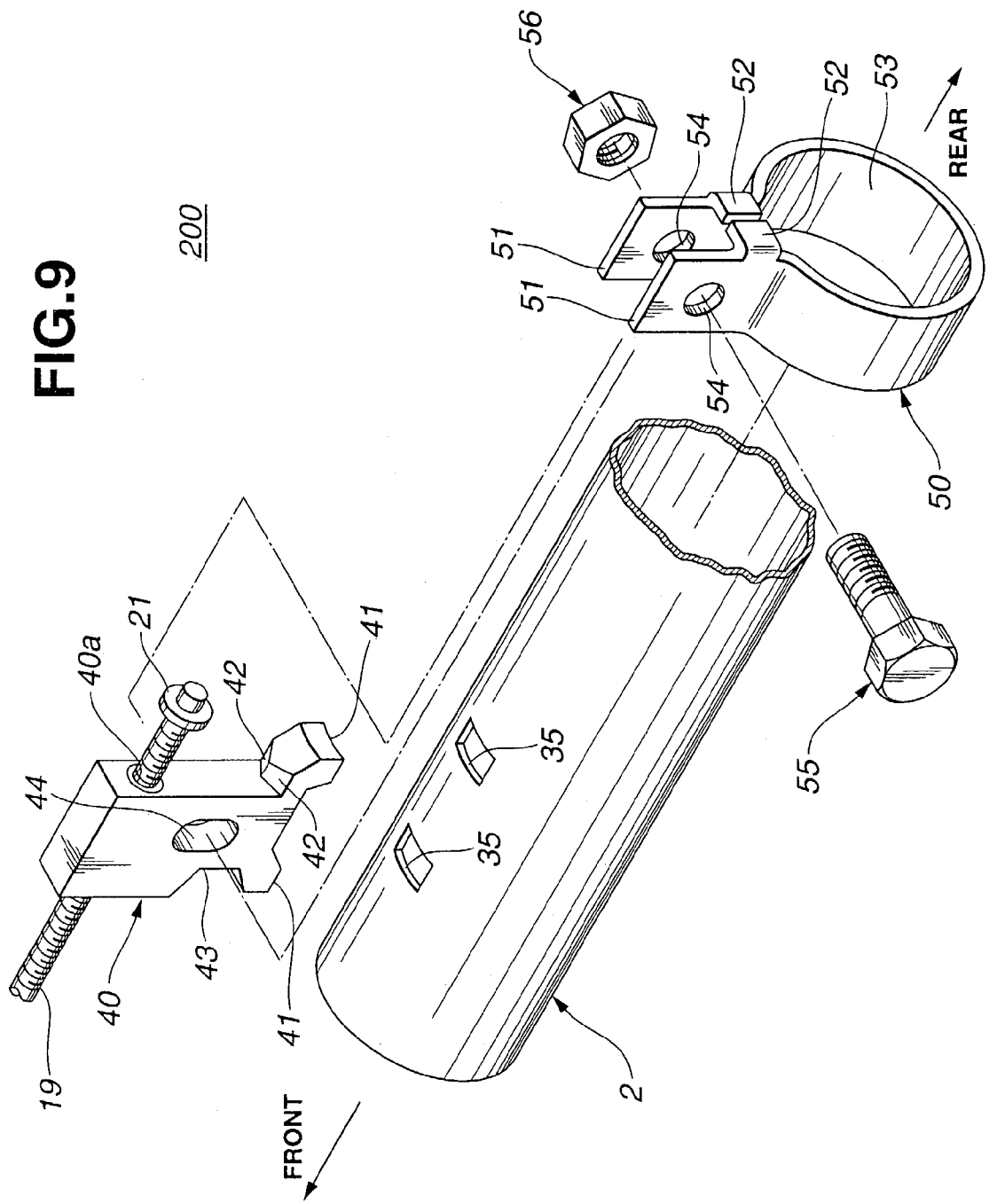
FIG. 9 is an exploded view of an essential portion of the second embodiment of the present invention.

Referring to FIGS. 6 to 9, particularly FIG. 9, there is shown part of a power telescopic mechanism employed in a second embodiment 200 of the present invention.

In this second embodiment 200, there is no separate member which corresponds to the tube 2d employed in the above-mentioned first embodiment 100. That is, as is seen from FIGS. 6 and 9, in the second embodiment 200, a nut block 40 is directly mounted to the sliding jacket 2.

As is seen from FIG. 9, the sliding jacket 2 is formed at a front end portion with two rectangular openings 35 which are axially spaced. For fixing the nut block 40 to the sliding jacket 2, a binding bracket 50 is used.

The nut block 40 is formed with a threaded bore 40a with which the threaded shaft 19 extending from the drive unit 18 (see FIG. 1) is operatively engaged. A stopper 21 is fixed to a leading end of the threaded shaft 19.

The nut block 40 comprises two short leg portions 41 which are to be engaged with the openings 35 of the sliding jacket 2. The rear leg portion 41, which is directed toward the steering wheel, is formed with a triangular roof including mutually angled inclined surfaces 42. The nut block 40 is formed, at a portion just above the front leg portion 41, with a recess 43. Furthermore, the nut block 40 is formed, at a portion between the recess 43 and the triangular roof, with an opening 44 which has an oval cross section.

Figure 6:
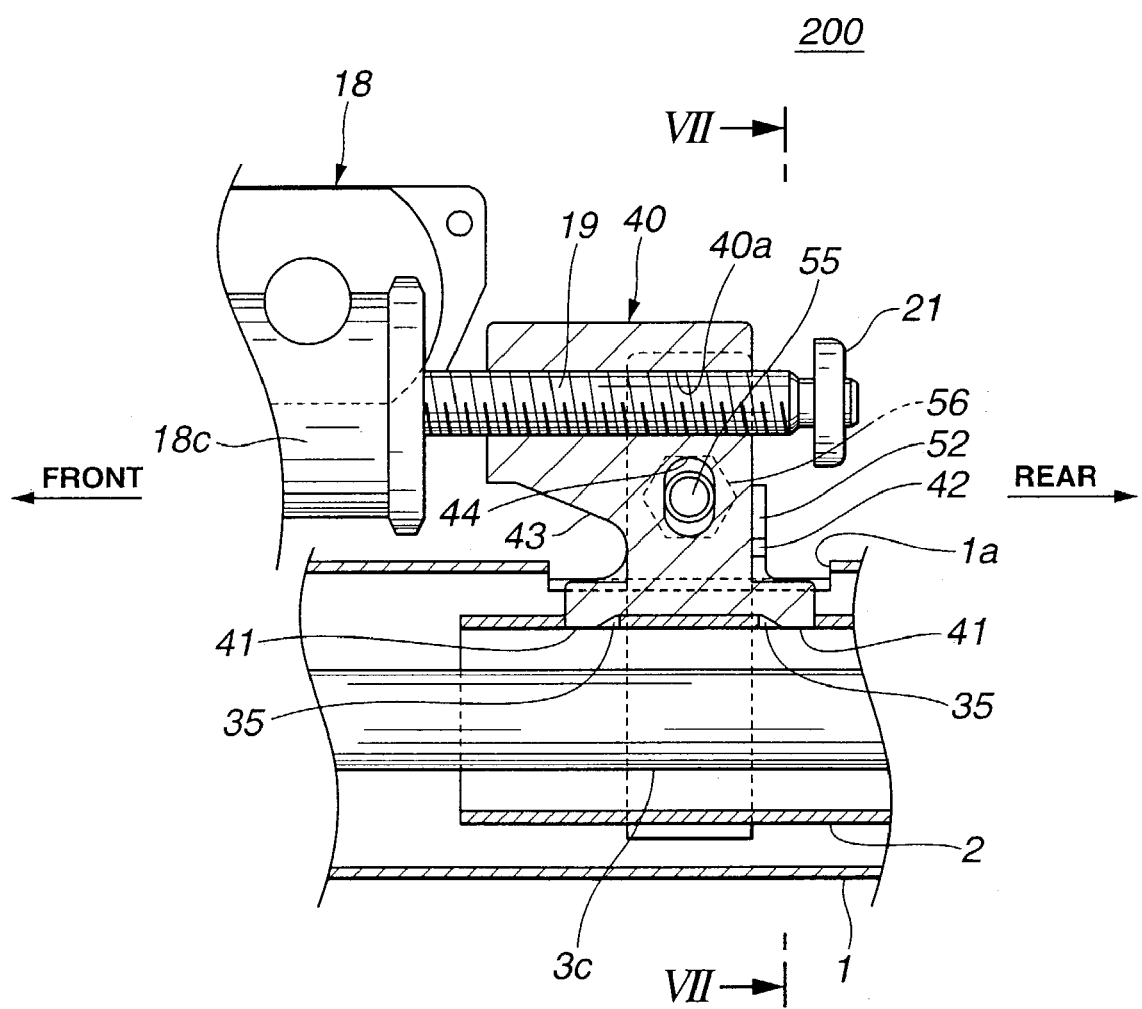
FIG. 6 is a view similar to FIG. 2, but showing a second embodiment of the present invention.

As is understood from FIG. 6, the distance between the two short leg portions 41 is smaller than the axial length of the rectangular opening 1a of the stationary jacket 1. When properly assembled, the recess 43 of the nut block 40 is oriented to face a front end of the rectangular opening 1a. Due to provision of the recess 43, the axially moved distance of the nut block 40 relative to the stationary jacket 1 increases by a distance corresponding the depth of the recess 43.

Referring back to FIG. 9, the binding bracket 50 comprises a round gripping portion 53 which is disposed on the sliding jacket 2 and two gripping arms 51 which are integral with the round gripping portion 53 and have aligned openings 54, as shown. The two gripping arms 51 have at their rear ends projections 52 which extend toward each other.

As is understood from FIGS. 6 and 9, for assembling the power telescopic mechanism, the round gripping portion 53 of the binding bracket 50 is disposed on the sliding jacket 2, and the two gripping arms 51 are opened to receive therebetween the nut block 40 in such a manner that the oval opening 44 of the nut block 40 is aligned with the aligned openings 54 of the gripping arms 51 and the short leg portions 41 are engaged with the openings 35 of the sliding jacket 2. Then, a bolt 55 is passed through the aligned openings 54, 44 and 54 and engaged with a nut 56.

As is shown in FIG. 7, upon this, the projections 52 of the binding bracket 50 are respectively put on the inclined surfaces 42 of the triangular roof of the rear leg portion 41 of the nut block 40. Thus, turning the bolt 55 in a fastening direction induces a downward movement of the triangular roof of the nut block 40 thereby establishing a tight fixing of the nut block 40 to the sliding jacket 2.

In the following, assembling steps for mounting the nut block 40 to the sliding jacket 2 by using the binding bracket 50 will be described with reference to FIGS. 1, 8 and 9.

With the bearing 12 and the front shaft 3c being not installed in the stationary jacket 1, the round gripping portion 53 of the binding bracket 50 is inserted into the stationary jacket 1 through the rectangular opening 1a of the stationary jacket 1, and the sliding jacket 2 is moved axially to achieve coupling of the gripping portion 53 with the sliding jacket 2. Then, as is seen from FIG. 8, the two gripping arms 51 are opened to put therebetween the nut block 40, and then the short leg portions 41 of the nut block 40 are brought into engagement with the openings 35 of sliding jacket 2. Then, the bolt 55 is passed through the openings 54, 44 and 54 and tightly engaged with the nut 56. Of course, the projections 52 of the binding bracket 50 are put on the inclined surfaces 42 of the nut block 40. Due to the oval shape of the opening 44 of the nut block 40, a dimensional error inevitably possessed by the nut block 40 and the sliding jacket 2 is compensated.

When, in operation, the switch SW is turned ON, the threaded shaft 19 of the drive unit 18 is turned about its axis in a given direction. With this, the nut block 40 is moved axially along the threaded shaft 19 moving the sliding jacket 2 in the same direction. Thus, the steering wheel is moved toward or away from the driver for the reason as has been mentioned in the section of the first embodiment 100. When the switch SW is turned OFF, the steering wheel stops at a desired new position.

Figure 10:
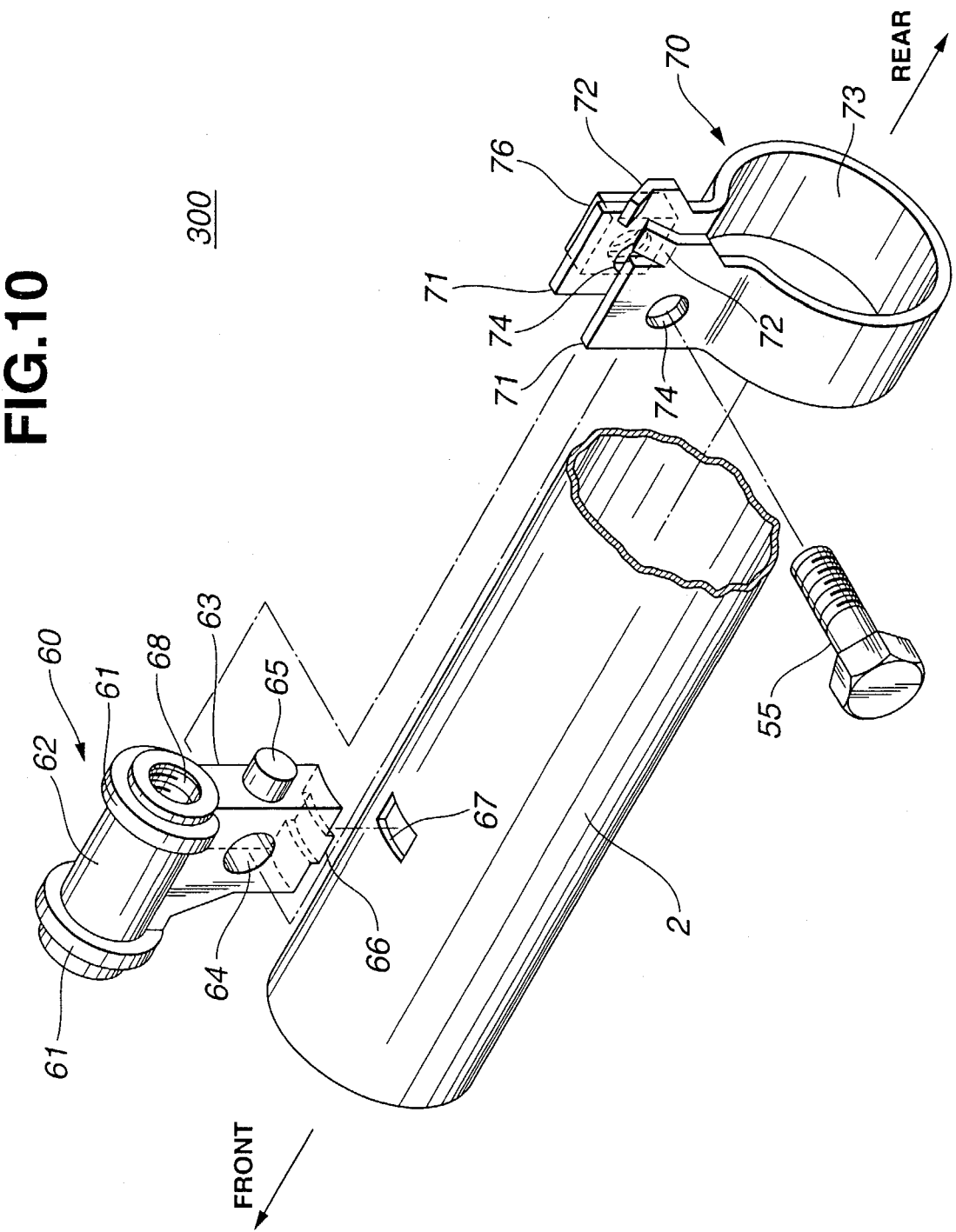
FIG. 10 is a view similar to FIG. 9, but showing an essential portion of a third embodiment of the present invention.
Figure 11:
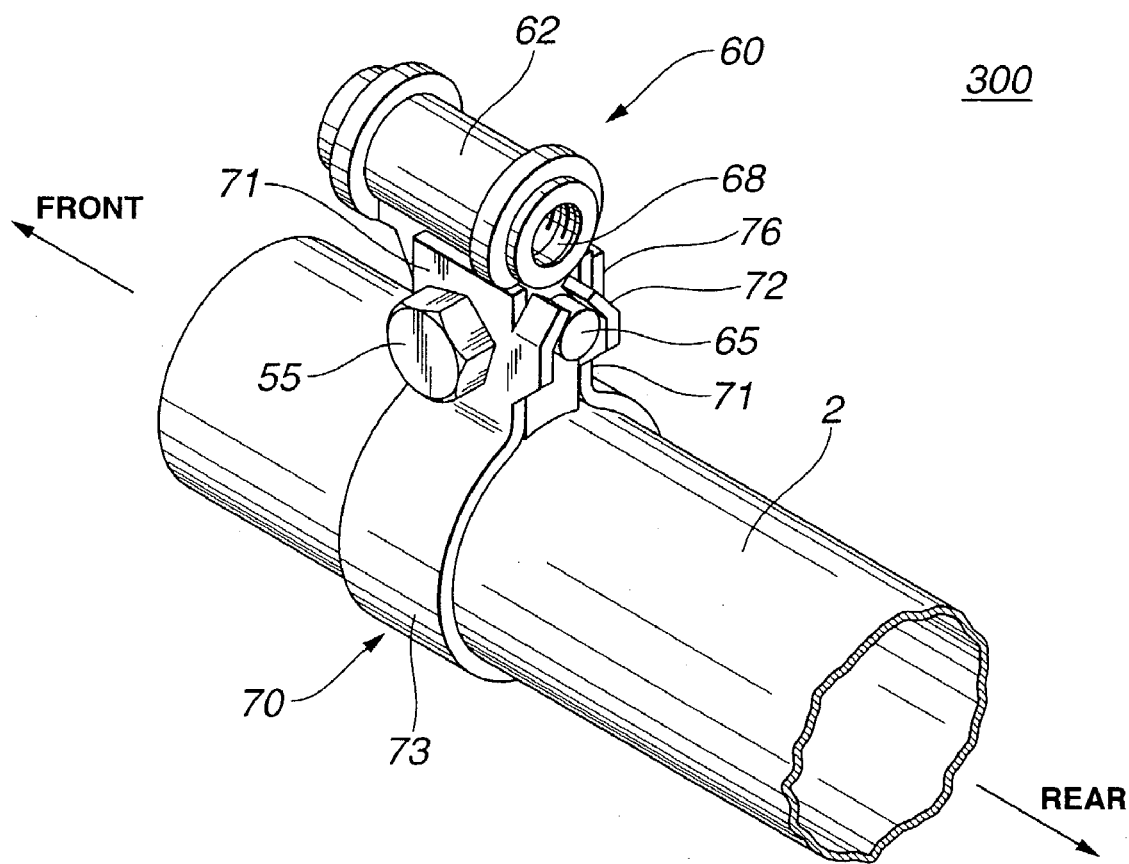
FIG. 11 is a perspective view of the essential portion of the third embodiment in an assembled condition.

Referring to FIGS. 10 and 11, there is shown part of a power telescopic mechanism employed in a third embodiment 300 of the present invention.

Like in the above-mentioned second embodiment 200, in the third embodiment 300, there is no separate member which corresponds to the tube 2d employed in the first embodiment 100.

As is seen from FIG. 10, in the third embodiment 300, a nut block 60 is directly mounted to the sliding jacket 2.

The sliding jacket 2 is formed at a front end portion with a rectangular opening 67. For fixing the nut block 60 to the sliding jacket 2, a binding bracket 70 is used.

The nut block 60 generally comprises a cylindrical portion 62 which has a threaded bore 68 operatively engaged with the threaded shaft 19 (see FIG. 1) of the drive unit 18, and a stand portion 63 which has an opening 64 formed therethrough. The cylindrical portion 62 is formed at axially opposed ends thereof with annular projections 61 respectively. The stand portion 63 is formed at a rear end thereof with a cylindrical stud 65 and at a bottom thereof with a rectangular projection 66 which is to be engaged with the rectangular opening 67 of the sliding jacket 2.

The binding bracket 70 comprises a round gripping portion 73 which is disposed on the sliding jacket 2 and two gripping arms 71 which are integral with the round gripping portion 73 and have aligned openings 74, as shown. The two gripping arms 71 have at their rear ends inclined portions 72 which are inclined toward each other. One of the gripping arms 71 has a nut 76 welded thereto.

As is understood from FIGS. 10 and 11, for assembling the power telescopic mechanism in the third embodiment 300, the round gripping portion 73 of the binding bracket 70 is disposed on the sliding jacket 2, and the two gripping arms 71 are opened to receive therebetween the stand portion 63 of the nut block 60 in such a manner that the opening 64 of the nut block 60 is aligned with the aligned openings 74 of the gripping arms 71 and the rectangular projection 66 of the nut block 60 is engaged with the opening 67 of the sliding jacket 2. Then, a bolt 55 is passed through the aligned openings 74, 64 and 74 and rightly engaged with the nut 76. Preferably, the opening 64 of the nut block 60 is slightly larger in diameter than the bolt 55 for compensating a dimensional error that is inevitably possessed by the nut block 60 and sliding jacket 2.

As shown in FIG. 11, upon assembly, the inclined portions 72 of the binding bracket 70 are intimately put on the cylindrical stud 65 of the nut block 60. Thus, turning the bolt 55 in a fastening direction induces a downward movement of the nut block 60 thereby establishing a tight fixing of the nut block 60 to the sliding jacket 2.

Since the assembling steps for mounting the nut block 60 to the sliding jacket 2 by using the binding bracket 70 and the operation of the power telescopic mechanism employed in the third embodiment 300 are substantially the same as those of the above-mentioned second embodiment 200, description of them will be omitted.

Figure 12:
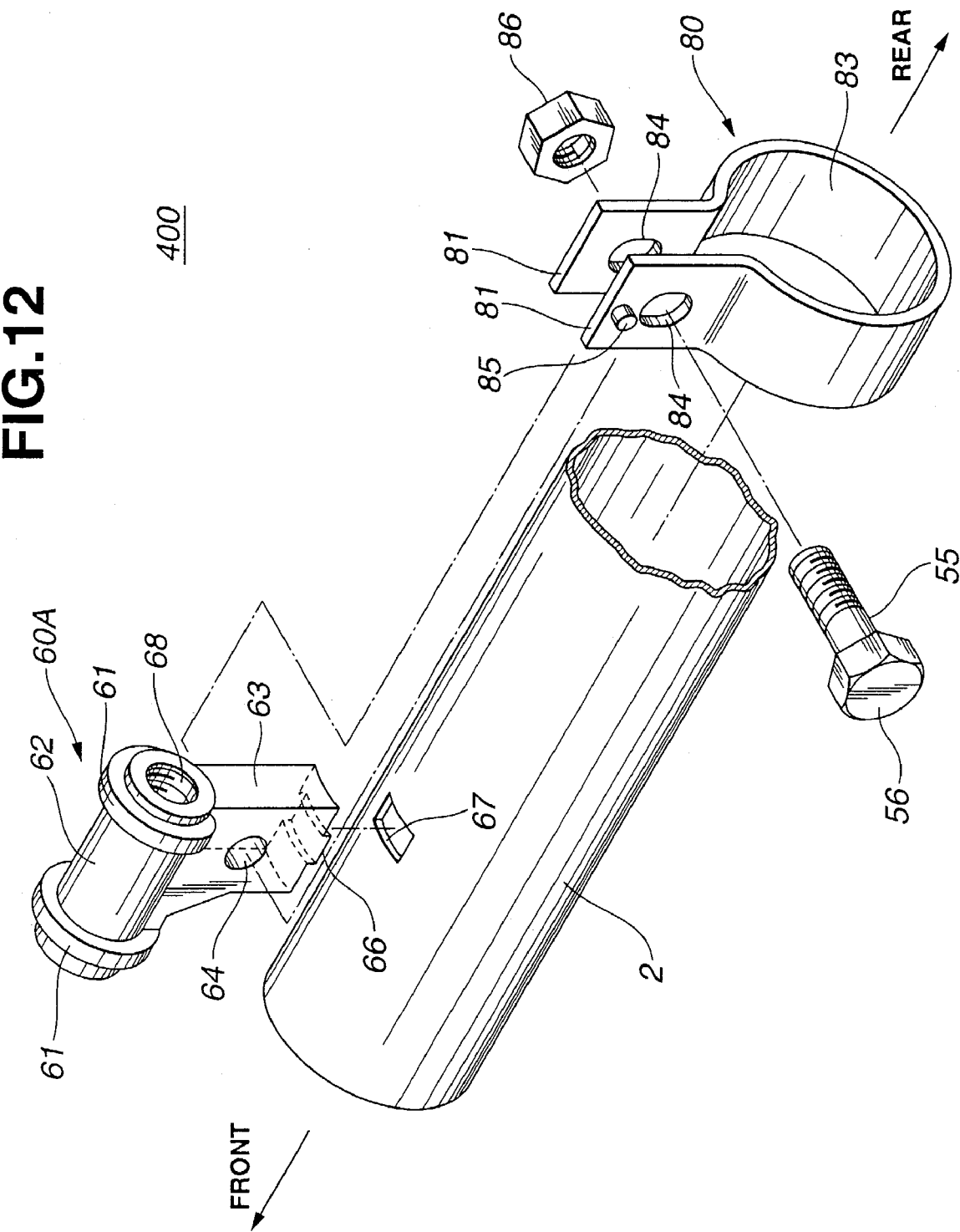
FIG. 12 is a view similar to FIG. 9, but showing an essential portion of a fourth embodiment of the present invention.
Figure 13A:
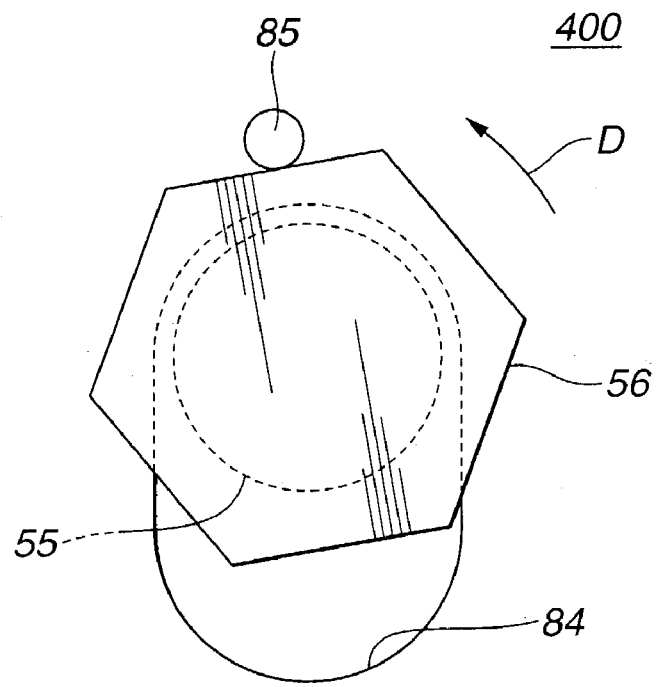
FIGS. 13A and 13B are illustrations for explaining operation of the fourth embodiment.
Figure 13B:
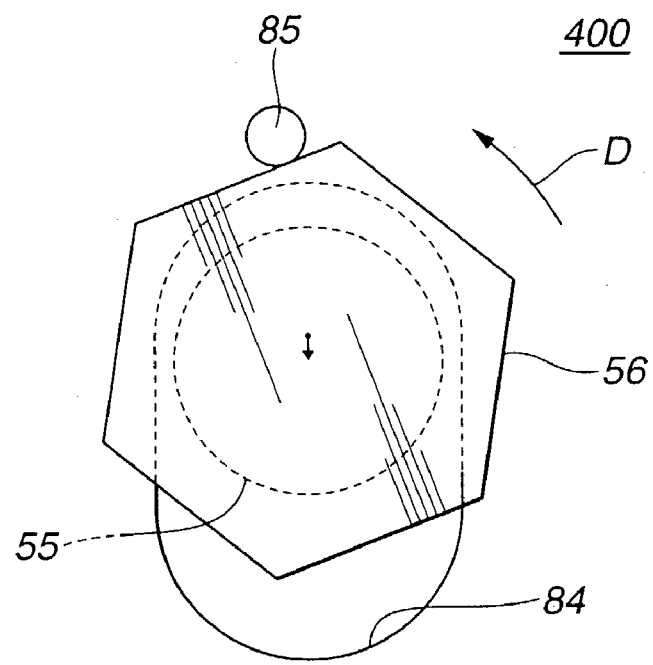

Referring to FIGS. 12, 13A and 13B, particularly FIG. 12, there is shown part of a power telescopic mechanism employed in a fourth embodiment 400 of the present invention.

As shown in FIG. 12, a nut block 60A employed in the fourth embodiment 400 is substantially the same as the nut block 60 of the third embodiment 300 except for the cylindrical stud (65). That is, in the fourth embodiment 400, the nut block 60A has no portion that corresponds to the stud (65).

For fixing the nut block 60A to the sliding jacket 2, an binding bracket 80 is used.

The binding bracket 80 comprises a round gripping portion 83 which is disposed on the sliding jacket 2 and two gripping arms 81 which are integral with the round gripping portion 83 and have aligned openings 84. Each opening 84 is slightly larger in diameter than a bolt 55 or has an oval cross section. The opening 64 of the nut block 60A is generally the same in diameter as the bolt 55. One of the gripping arms 81 is provided at its outer surface with a pin 85.

As is understood from FIGS. 12, 13A and 13B, the pin 85 is positioned to be engageable with six sides of a hexagonal head 56 of the bolt 55 upon assembly of the power telescopic mechanism.

As is understood from FIG. 12, for assembling the power telescopic mechanism in the fourth embodiment 400, the round gripping portion 83 of the binding bracket 80 is disposed on the sliding jacket 2, and the two gripping arms 81 are opened to receive therebetween the stand portion 63 of the nut block 60A in such a manner that the opening 64 of the nut block 60A is aligned with the aligned openings 84 of the gripping arms 81 and the rectangular projection 66 of the nut block 60A is engaged with the opening 67 of the sliding jacket 2. Then, the bolt 55 is passed through the aligned openings 84, 64 and 84 and engaged with a nut 86.

As shown in FIG. 13A, upon this, one side of the hexagonal head 56 of the bolt 55 is in contact with the pin 85 of the gripping arm 81. Thus, as is seen from FIGS. 13A and 13B, when the nut 86 is turned deeply in a fastening direction, that is, in the direction as indicated by the arrow D, the bolt 55 is shifted downward by a certain distance in the openings 84 together with the nut block 60A thereby establishing a tight fixing of the nut block 60A to the sliding jacket 2.

Since the assembling steps for mounting the nut block 60A to the sliding jacket 2 by using the binding bracket 80 and the operation of the power telescopic mechanism in the fourth embodiment 400 are substantially the same as those of the above-mentioned second embodiment 200, description of them will be omitted.

Figure 14:
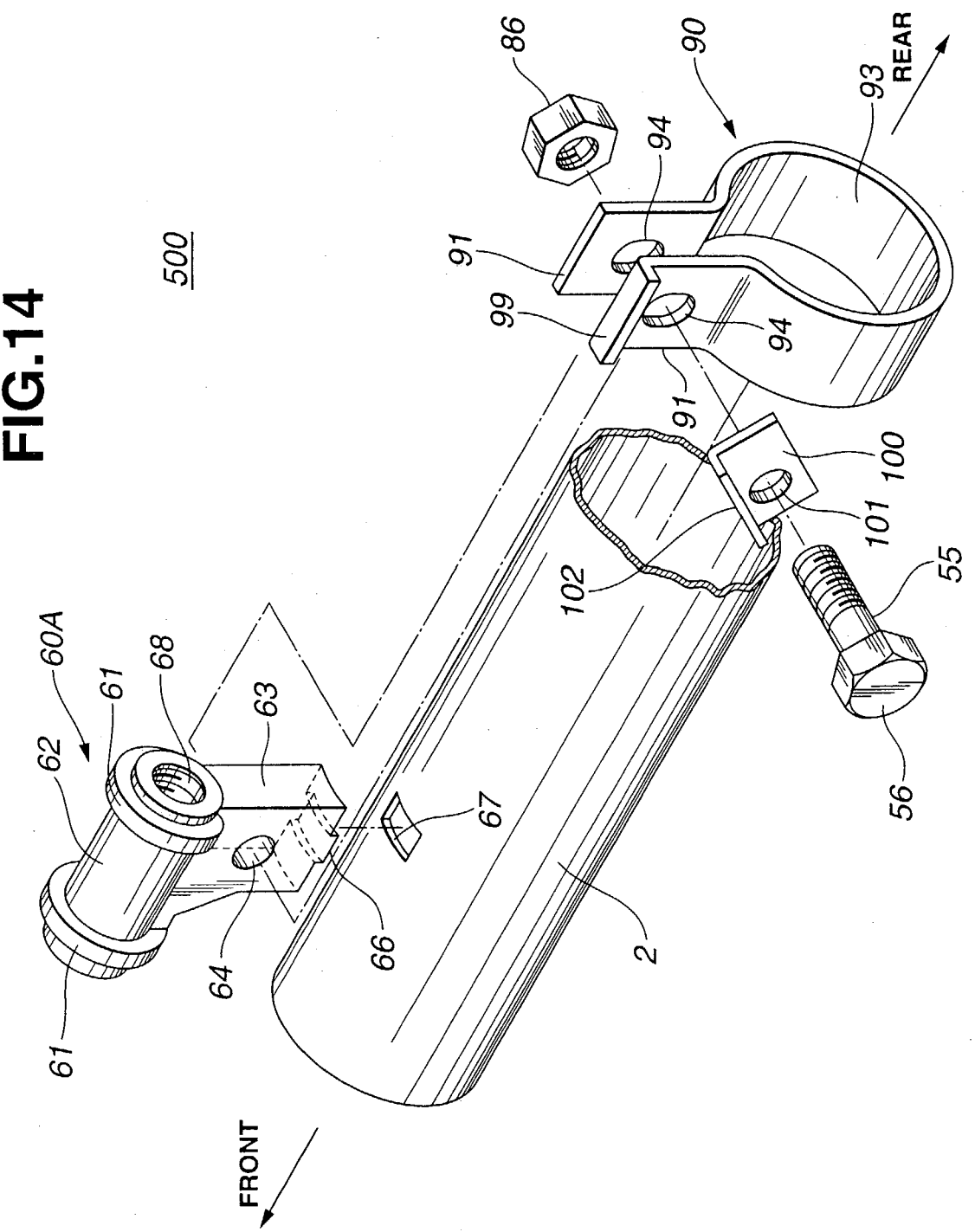
FIG. 14 is a view similar to FIG. 9, but showing an essential portion of a fifth embodiment of the present invention.
Figure 15A:
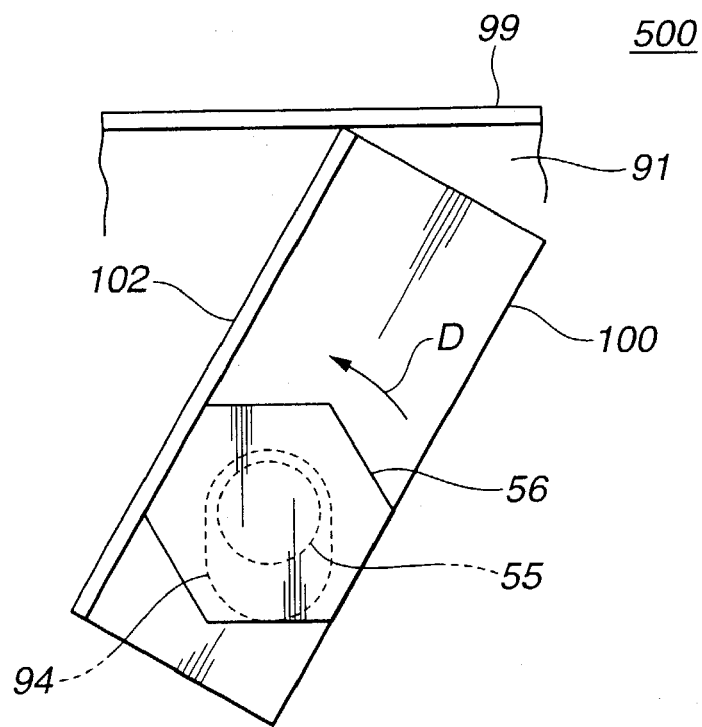
FIGS. 15A and 15B are illustrations for explaining operation of the fifth embodiment of the present invention.
Figure 15B:
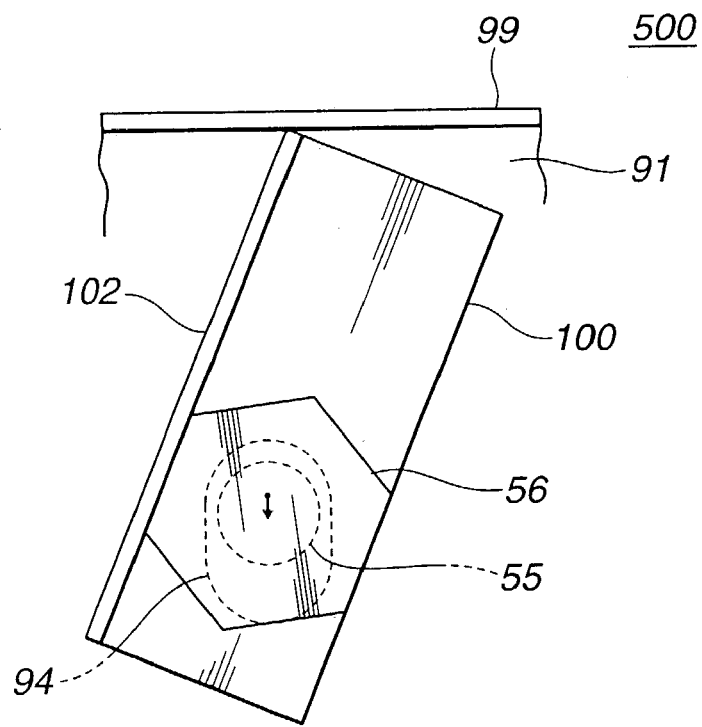

Referring to FIGS. 14, 15A and 15B, particularly FIG. 14, there is shown part of a power telescopic mechanism employed in a fifth embodiment 500 of the present invention.

As shown in FIG. 14, a nut block 60A employed in this fifth embodiment 500 is the same as the nut block 60A of the above-mentioned fourth embodiment 400.

For fixing the nut block 60A to the sliding jacket 2, an binding bracket 90 is used.

The binding bracket 90 comprises a round gripping portion 93 which is disposed on the sliding jacket 2 and two gripping arms 91 which are integral with the round gripping portion 93 and have aligned openings 94. Each opening 94 is slightly larger in diameter than a bolt 55 or has an oval cross section. The opening 64 of the nut block 60A is generally the same in diameter as the bolt 55. One of the gripping arms 91 has a bent upper end 99. A rectangular washer 100 is employed, which has an opening 101 formed therethrough and one edge 102 normally bent.

As is understood from FIGS. 14, 15A and 15B, the rectangular washer 100 is constructed and sized to be contactable at the normally bent edge 102 to six sides of the hexagonal head 56 of the bolt 55 as well as the bent upper end 99 of the gripping arm 91 of the binding bracket 90 upon assembly of the power telescopic mechanism.

As is understood from FIG. 14, for assembling the power telescopic mechanism in the fifth embodiment 500, the round gripping portion 93 of the binding bracket 90 is disposed on the sliding jacket 2, and the two gripping arms 91 are opened to receive therebetween the stand portion 63 of the nut block 60A in such a manner that the opening 64 of the nut block 60A is aligned with the aligned openings 94 of the gripping arms 91 and the rectangular projection 66 of the nut block 60A is engaged with the opening 67 of the sliding jacket 2. Then, the bolt 55 is passed through the opening 101 of the rectangular washer 100 and through the aligned openings 94, 64 and 94 and engaged with a nut 86.

As is seen from FIG. 15A, upon this, one side of the hexagonal head 56 of the bolt 55 is in contact with the normally bent edge 102 of the washer 100. Thus, as is seen from FIGS. 14A and 14B, when the nut 86 is turned deeply in a fastening direction, that is, in the direction as indicated by the arrow D, the washer 100 is brought into abutment with the bent upper end 99 of the gripping arm 91. Thus, when the fastening turning of the nut 86 is continued, the abutment of the washer 100 with the bent upper end 99 brings about a downward movement of the bolt 55 increasing a pressing force by which the nut block 60A is pressed against the sliding jacket 2. Thus, the nut block 60A is tightly fixed to the sliding jacket 2.

Figure 17A:
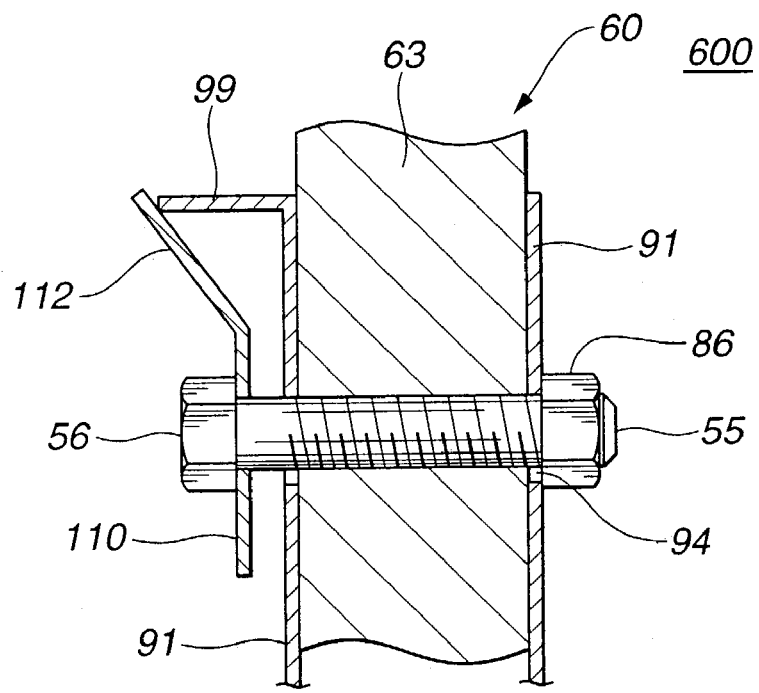
FIGS. 17A and 17B are illustrations for explaining operation of the sixth embodiment of the present invention.
Figure 17B:
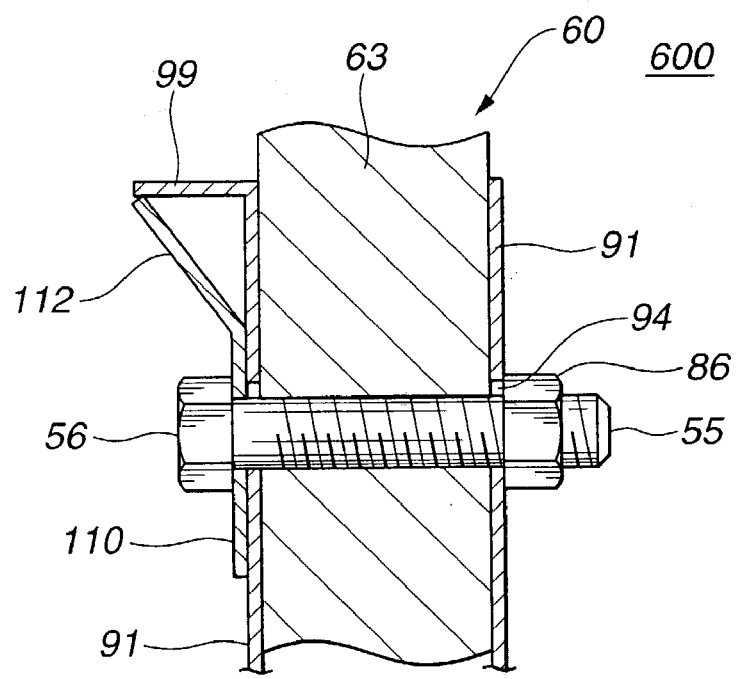

Referring to FIGS. 16, 17A and 17B, particularly FIG. 16, there is shown part of a power telescopic mechanism employed in a sixth embodiment 600 of the present invention.

Since this sixth embodiment 600 is similar to the above-mentioned fifth embodiment 500, only parts or portions that are different from those of the fifth embodiment 500 will be described in the following.

That is, in the sixth embodiment 600, a rectangular spring washer 110 is used in place of the rectangular washer 100 of the fifth embodiment 500. The spring washer 110 has an opening 111 formed therethrough and a sloped upper end 112.

As is understood from FIGS. 16, 17A and 17B, the spring washer 110 is constructed and sized to be contactable at the sloped upper end 112 to the bent upper end 99 of the gripping arm 91 of the binding bracket 90 upon assembly of the power telescopic mechanism.

As is understood from FIG. 16, for assembling the power telescopic mechanism in the sixth embodiment 600, the round gripping portion 93 of the binding bracket 90 is disposed on the sliding jacket 2, and the two gripping arms 91 are opened to receive therebetween the stand portion 63 of the nut block 60A in such a manner that the opening 64 of the nut block 60A is aligned with the aligned openings 94 of the gripping arms 91 and the rectangular projection 66 of the nut block 60A is engaged with the opening 67 of the sliding jacket 2. Then, the bolt 55 is passed through the opening 111 of the spring washer 110 and through the aligned openings 94, 64 and 94 and engaged with a nut 86.

As is seen from FIG. 17A, upon this, the sloped upper end 112 of the spring washer 110 is put on a top of the bent upper end 99 of the gripping arm 91. When the nut 86 is turned in a fastening direction, the sloped upper end 112 of the spring washer 110 is forced to slip down and slide on a lower surface of the bent upper end 99 of the gripping arm 91 as is shown in FIG. 17B. Thus, when the fastening turning of the nut 86 is continued, the abutment of the sloped upper end 112 with the lower surface of the bent upper end 99 brings about a downward movement of the bolt 55 increasing a pressing force by which the nut block 60A is pressed against the sliding jacket 2. Thus, the nut block 60A is tightly fixed to the sliding jacket 2.

Figure 19A:
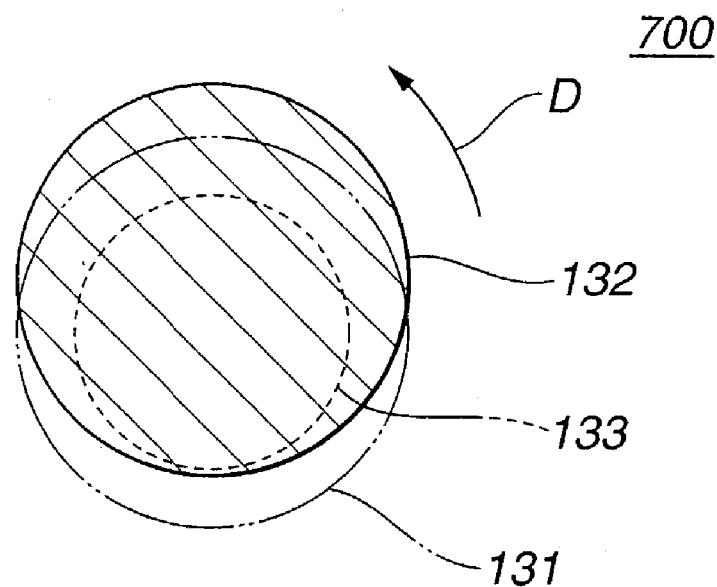
FIGS. 19A and 19B are illustrations for explaining operation of the seventh embodiment of the present invention.
Figure 19B:
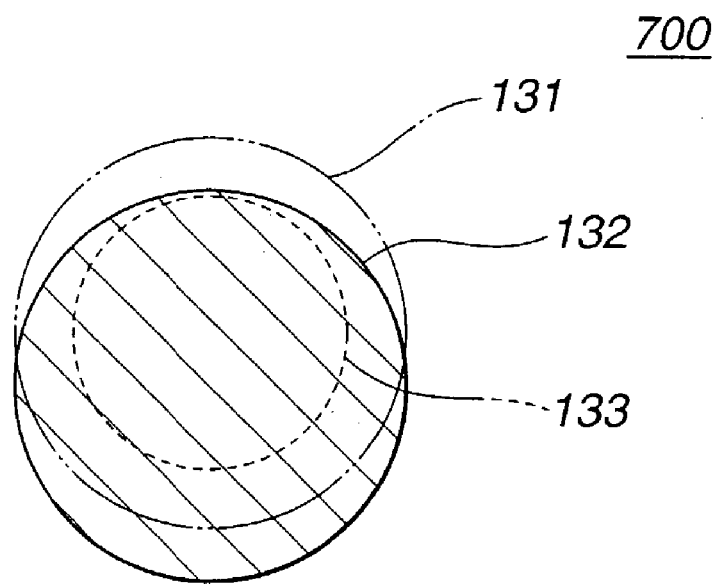

Referring to FIGS. 18, 19A and 19B, particularly FIG. 18, there is shown part of a power telescopic mechanism employed in a seventh embodiment 700 of the present invention. Since this seventh embodiment 700 is similar to the above-mentioned fourth embodiment 400, only different parts or portions that are different from those of the fourth embodiment 400 will be described in the following.

In this seventh embodiment 700, for fixing a nut block 60A to the sliding jacket 2, a binding bracket 120 is used.

As is seen from FIG. 18, the binding bracket 120 comprises a round gripping portion 123 which is disposed on the sliding jacket 2 and two gripping arms 121 which are integral with the round gripping portion 123 and have aligned openings 124 and 125. The opening 125 is larger in diameter than the opening 124, as shown. A bolt 130 comprises a concentric first part 131 which is mated with the larger opening 125 of the gripping arm 121, an eccentric second part 132 which is mated with the opening 64 of the nut block 60A and a concentric threaded part 133 which is mated with the smaller opening 124 of the other gripping arm 121 and engaged with a nut 86.

As is understood from FIG. 18, for assembling the power telescopic mechanism in the seventh embodiment 700, the round gripping portion 123 of the binding bracket 120 is disposed on the sliding jacket 2, and the two gripping arms 121 are opened to receive therebetween the stand portion 63 of the nut block 60A in such a manner that the opening 64 of the nut block 60A aligned with the aligned openings 124 and 125 of the gripping arms 121 and the rectangular projection 66 of the nut block 60A is engaged with the opening 67 of the sliding jacket 2. Then, the bolt 130 is passed through the aligned openings 125, 64 and 124 and engaged with the nut 86. Under this condition, the first, second and third parts 131, 132 and 133 of the bolt 130 are mated with the openings 125, 64 and 124 respectively.

Thus, when thereafter the nut 86 is turned in a fastening direction, the eccentric second part 132 of the bolt 130 forces the nut block 60A to be pressed against the sliding jacket 2 and thus the nut block 60A is tightly fixed to the sliding jacket 2.

As will be understood from the foregoing description, in accordance with the present invention, the nut block 20, 40, 60 or 60A driven by the drive unit 18 through the threaded shaft 19 is fixed to the sliding jacket 2 by means of the binding bracket 22, 50, 70, 80, 90 or 120 and the bolt 28, 55 or 130 and the nut 29, 56, 76 or 86. This arrangement minimizes the restriction in making a layout of the power telescopic mechanism in the steering column. In other words, according to the present invention, the power telescopic mechanism can be arranged at various positions of the steering column freely according to the needs by an associated motor vehicle, which solves the drawbacks possessed by the aforementioned related art.

The entire contents of Japanese Patent Application 2002-155266 (filed May 29, 2002) are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A power telescopic steering column comprising:
a stationary jacket adapted to be fixed to a vehicle body;
a sliding jacket axially slidably received in the stationary jacket;
a steering shaft including a first shaft part which is axially movable together with the sliding jacket and adapted to be connected to a steering wheel and a second shaft part which is rotatable together with the first shaft part while being suppressed from moving in an axial direction;
an opening formed in the stationary jacket;
an electric drive unit fixed to an outer side of the stationary jacket, the drive unit having a threaded output shaft;
a nut block operatively engaged with the threaded output shaft;
a binding bracket which extends between the sliding jacket and the nut block through the opening of the stationary jacket, the binding bracket including a round gripping portion which is disposed on the sliding jacket and two gripping arms which grasp therebetween the nut block; and
a tightening device which applies a pressing force to the binding bracket to allow the binding bracket to tightly grasp the sliding jacket at the round gripping portion and the nut block at the two gripping arms.

2. The power telescopic steering column as claimed in claim 1, in which the two gripping arms of the binding bracket extend in the same direction from circumferentially opposed ends of the round gripping portion.

3. The power telescopic steering column as claimed in claim 2, in which the tightening device comprises:
a bolt that passes through aligned openings formed in the two gripping arms; and
a nut engaged with the bolt in a manner to reduce a distance between the two gripping arms.

4. The power telescopic steering column as claimed in claim 3, in which the nut is welded to one of the two gripping arms in a manner to align with the opening of the corresponding gripping arm.

5. The power telescopic steering column as claimed in claim 1, in which the nut block is formed with opposed flat surfaces on which inner walls of the two gripping arms abut.

6. The power telescopic steering column as claimed in claim 5, in which the nut block is shaped to have a rectangular cross section and the two gripping arms are bent to surround the nut block in a manner to suppress a play of the nut block relative to the gripping arms.

7. The power telescopic steering column as claimed in claim 6, further comprising a stopper structure which suppresses a free movement of the round gripping portion of the binding bracket relative to the sliding jacket.

8. The power telescopic steering column as claimed in claim 7, in which the stopper structure comprises:
projections possessed by the round gripping portion of the binding bracket; and
openings formed in the sliding jacket to receive the projections of the round gripping portion.

9. The power telescopic steering column as claimed in claim 7, in which the stopper structure comprises:
two projections formed on diametrically opposed portions of the round gripping portion of the binding bracket; and
two generally L-shaped slits formed in diametrically opposed portions of the sliding bracket to receive the two projections of the round gripping portion respectively.

10. The power telescopic steering column as claimed in claim 6, in which the nut block is formed with a neck portion of a rectangular cross section and the bent portions of the two gripping arms intimately surround the neck portion.

11. The power telescopic steering column as claimed in claim 5, in which the tightening device comprises:
aligned openings formed in one of the gripping arms, the nut block and the other gripping arm in order;
a bolt passing through the aligned openings; and
a nut engaged with the bolt to press the gripping arms against opposed flat surfaces of the nut block.

12. The power telescopic steering column as claimed in claim 11, further comprising a positioning device which comprises:
an opening formed in the sliding jacket; and
a projection formed on the nut block and engaged with the opening of the sliding jacket.

13. The power telescopic steering column as claimed in claim 12, in which the diameter of the opening of the nut block is larger than that of the openings of the gripping arms.

14. The power telescopic steering column as claimed in claim 12, further comprising a pressing device which presses the nut block against the sliding jacket when the two gripping arms are brought close to each other by the tightening device.

15. The power telescopic steering column as claimed in claim 14, in which the pressing device comprises:
- a projection formed on the nut block; and
- a sloped portion possessed by the binding bracket, the sloped portion being slidably disposed on the projection.

16. The power telescopic steering column as claimed in claim 15, in which the projection of the nut block is formed with an inclined surface against which the sloped portion of the binding bracket abuts.

17. The power telescopic steering column as claimed in claim 14, in which the diameter of the openings of the two gripping arms is larger than that of the opening of the nut block.

18. The power telescopic steering column as claimed in claim 17, in which the pressing device comprises:
- a polygonal head possessed by the bolt; and
- a pin provided on one of the two gripping arms and slidably contactable with sides of the polygonal head of the bolt.

19. The power telescopic steering column as claimed in claim 17, in which the pressing device comprises:
- a polygonal head possessed by the bolt;
- a washer having a normally bent end which is contactable with sides of the polygonal head, the washer having an opening through which the bolt passes; and
- a normally bent upper end possessed by one of the two gripping arms and engageable with the normally bent end of the washer.

20. The power telescopic steering column as claimed in claim 17, in which the pressing device comprises:
- a normally bent upper end possessed by one of the two gripping arms; and
- a spring washer having an inclined end which is engageable with the normally bent upper end of the gripping arm, the spring washer having an opening through which the bolt passes.

21. The power telescopic steering column as claimed in claim 17, in which the pressing device comprises:
- a first concentric part formed on the bolt and received in the opening of one of the two gripping arms;
- a second eccentric part formed on the bolt and received in the opening of the nut block; and
- a third concentric part formed on the bolt and received in the opening of the other gripping arm.

22. The power telescopic steering column as claimed in claim 11, further comprising a positioning device which comprises:
- two openings formed in axially spaced portions of the sliding jacket; and
- two leg portions possessed by the nut block and respectively engaged with the two openings of the sliding jacket.

23. The power telescopic steering column as claimed in claim 1, further comprising a tube coaxially secured to the sliding jacket to move therewith, the tube having the round gripping portion of the binding bracket mounted thereon.

* * * * *